United States Patent Office 2,792,250
Patented May 14, 1957

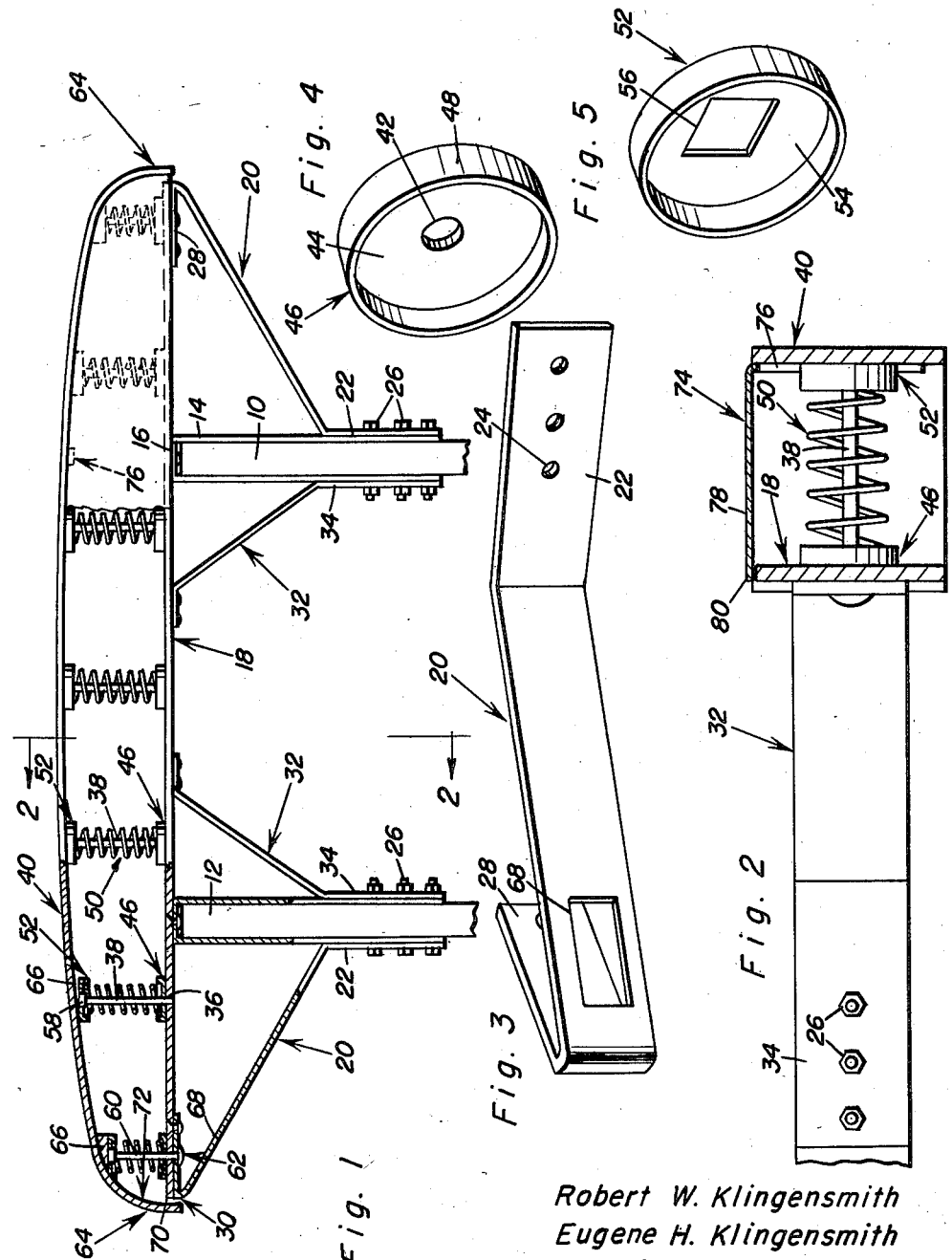

2,792,250

SAFETY BUMPER

Robert W. Klingensmith, Eugene H. Klingensmith, and Joseph Bematre, Jeannette, Pa.

Application April 24, 1953, Serial No. 350,790

1 Claim. (Cl. 293—85)

This invention relates generally to safety attachments for vehicles and pertains more particularly to an improved form of resilient bumper means.

A primary object of this invention is to provide an improvement in safety bumpers which incorporates a progressive rate of springing in its construction.

Another object of this invention is to provide an improvement in safety bumpers in which a snubber plate rigidly secured to a vehicle frame resiliently carries a bumper counter spring means being interposed between the snubber and the bumper for resisting relative movement therebetween, the bumper having portions thereof spaced nearer to the snubber plate than the remainder of the bumper so that the bumper will bottom against the snubber plate and utilize its inherent resiliency in absorbing shock when the vehicle strikes an object.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view partially in section showing the improved bumper mechanism in mounted position;

Figure 2 is a vertical section taken substantially on the plane of section line 2—2 of Figure 1 showing details of the bumper construction on an enlarged scale;

Figure 3 is a perspective view of one of the brace arms on an enlarged scale;

Figures 4 and 5 are enlarged perspective views of the spring locating cups.

Referring now more particularly to Figure 1, the reference numerals 10 and 12 indicate the frame horns of a vehicle which may be at either the front or rear thereof and it will be seen that the safety bumper attachment includes generally U-shaped brackets whose spaced legs 14 are adapted to straddle opposite sides of these frame horns, the bight portions 16 of the brackets being suitably secured to an elongated flat snubber plate 18.

Outer oblique brace arms 20 are provided at one end with one side of angularly disposed feet 22 in engagement with the mounting brackets and these portions are provided with apertures 24 through which suitable fastening means 26 pass in securing the brace arms as well as the brackets to the frame horns. The other ends of the arms are also provided with angularly disposed portions 28 suitably secured to corresponding end portions of the snubber plate and it will be seen that the bent portion of the arms forming these latter portions present a surface which is substantially continuous with the end surfaces of the snubber bar as indicated by the reference numeral 30. Inner oblique brace arms 32 are provided with the portions 34 secured to the other sides of brackets by the previously mentioned fastening means 26 and their other ends are laterally bent and suitably secured to the medial portion of the snubber plate. By this construction, it will be readily appreciated that the point of attachment of the outer brace arms, the inner brace arms and the bight portions of the brackets to the snubber plate effect a substantially continuous and extremely rigid support for preventing deformation of the snubber plate.

The snubber plate is provided with a plurality of transverse bores 36 through which the guide bolts 38 are freely slidable, the guide bolts being secured at their opposite ends to the bumper 40 in a manner presently apparent. Each of the bores is in register with a corresponding bore 42 through the main body portion 44 of the spring locating cups 46 which are, in turn, suitably secured to the snubber plate. The annular flange 48 of these cups provides a convenient fitting arrangement for the coil springs 50 forming resilient snubber means which are disposed in concentric relation with respect to the bolts 38 and which extend coterminously therewith to seat in the cups 52 which are suitably secured to the bumper 40. The base portion 54 of the latter cups are provided centrally with a square opening 56 within which the square heads 58 of the bolts 38 are received so that the bolt heads may be most efficiently secured thereto as by welding or the like. The disposition of the two seats assures proper positioning of the coil springs at all times. The end bolts 60 are headed over as at 62 to maintain the bumper in proper spaced relation with respect to the snubber plate.

It will be readily seen that the bumper 40 is arcuate in configuration and is spaced farthest from the snubber plate at its central portion and is disposed progressively nearer thereto by virtue of its arcuate configuration toward its opposite ends and it will also be noted that its end portions 64 are laterally bent toward the snubber plate and overlie the same as well as the previously mentioned surfaces 30 presented by the outer brace arms 20. In this manner, the end portions of the bumper present guides for preventing relative longitudinal movement between the bumper and the snubber plate should the force exerted against the bumper be other than longitudinally of the vehicle, as for example, when the vehicle strikes an object a glancing blow. In this case, one of the end portions 64 will engage against the corresponding end surface of the snubber plate and against one of the surfaces 30 to prevent other than slight deflection of the bumper longitudinally with respect to the snubber plate. Also, this particular relationship of parts will prevent the end portions of the bumper from being deformed inwardly and being jammed between the bumper and the snubber plate to prevent proper operation of the safety bumper. In this respect, it is preferred that only slight clearance be provided between the end portions 64 and the corresponding ends of the snubber plate and consequently the surfaces 30 previously described.

Since the bumper is arcuate in configuration, the length of the coil springs is progressively larger from the end portions of the bumper toward its center and in order to maintain the most remote cups 52 in proper face to face relationship with the corresponding cups 46 on the snubber plate, suitable bosses or wedge plates 66 may be provided on the inner surface of the bumper. Also, to provide clearance for the end bolts 60 when the bumper is moved toward the snubber plate, the outer brace arms 20 are provided with apertures 68 for passage of the end bolts therethrough.

In operation, when the vehicle strikes an object the bumper will be forced toward the snubber plate against the reaction of the coil springs for a predetermined distance until the outer end edge 70 of the snubber plate engages against an inner surface portion of the bumper, as at 72. When this bottoming of the bumper against the snubber plate occurs, much greater resistance to further movement of the bumper toward the snubber plate will occur due to the inherent resiliency of the former, thus providing an over-all progressive rate of springing as the bumper is moved toward the snubber plate. This is particularly important inasmuch as it is desired to provide a relatively light initial shock absorbing movement of the bumper to retard and minimize the initial shock, after which a progressively greater shock absorbing effect is mandatory for proper operation and safety of the device.

Referring now more particularly to the right hand portion of Figure 1 and Figure 2, it will be seen that a generally L-shaped cover member 74 has a pair of depending vertical legs 76 which are suitably secured to the inner surface of the bumper and the main top portion 78 of the cover extends the entire width of the assembly in covering relation thereto and its free end 80 is disposed in overlying relation with respect to the top surface of the snubber plate 18 as will most clearly be seen in Figure 2. This member serves not only as a cover for the device to present a pleasing assembly but also serves as a guide for the bumper to prevent downward deflection thereof which would engage its under surface with the top surface of the snubber plate.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A bumper attachment for vehicles having side frame members having front ends and comprising a snubber plate having ends, a pair of braces extending obliquely from the ends of said snubber plate, said braces having angularly disposed ends fixed to one side of the snubber plate and providing bends in said braces at said ends of the snubber plate, a bumper plate extending along the other side of the snubber plate, resilient snubber means interposed between said plates and yieldingly supporting said bumper plate on said snubber plate, said bumper plate having laterally curved ends overlying said bends and said ends of the snubber plate in close relation thereto for engaging said bends and said ends of the snubber plate to prevent longitudinal play of said bumper plate on said resilient means, and U-shaped bracket members on said snubber plate adapted to straddle and be fixed to said front ends of the frame members and having said pair of braces fixed to one side thereof.

References Cited in the file of this patent

UNITED STATES PATENTS

| | | |
|---|---|---|
| 1,487,772 | Wernig | Mar. 25, 1924 |
| 1,496,112 | Banschbach | June 3, 1924 |
| 1,618,394 | Voyatzis | Feb. 22, 1927 |
| 1,805,414 | Ohlendorf | May 12, 1931 |
| 2,573,510 | Terranova | Oct. 30, 1951 |
| 2,593,586 | Maag | Apr. 22, 1952 |
| 2,610,881 | Schuettpelz | Sept. 16, 1952 |
| 2,715,037 | Maag | Aug. 9, 1955 |